Jan. 6, 1970     C. O. LEYDIG ET AL     3,487,615
DOUBLE-BOOM HEDGER
Filed April 1, 1968                         6 Sheets-Sheet 1
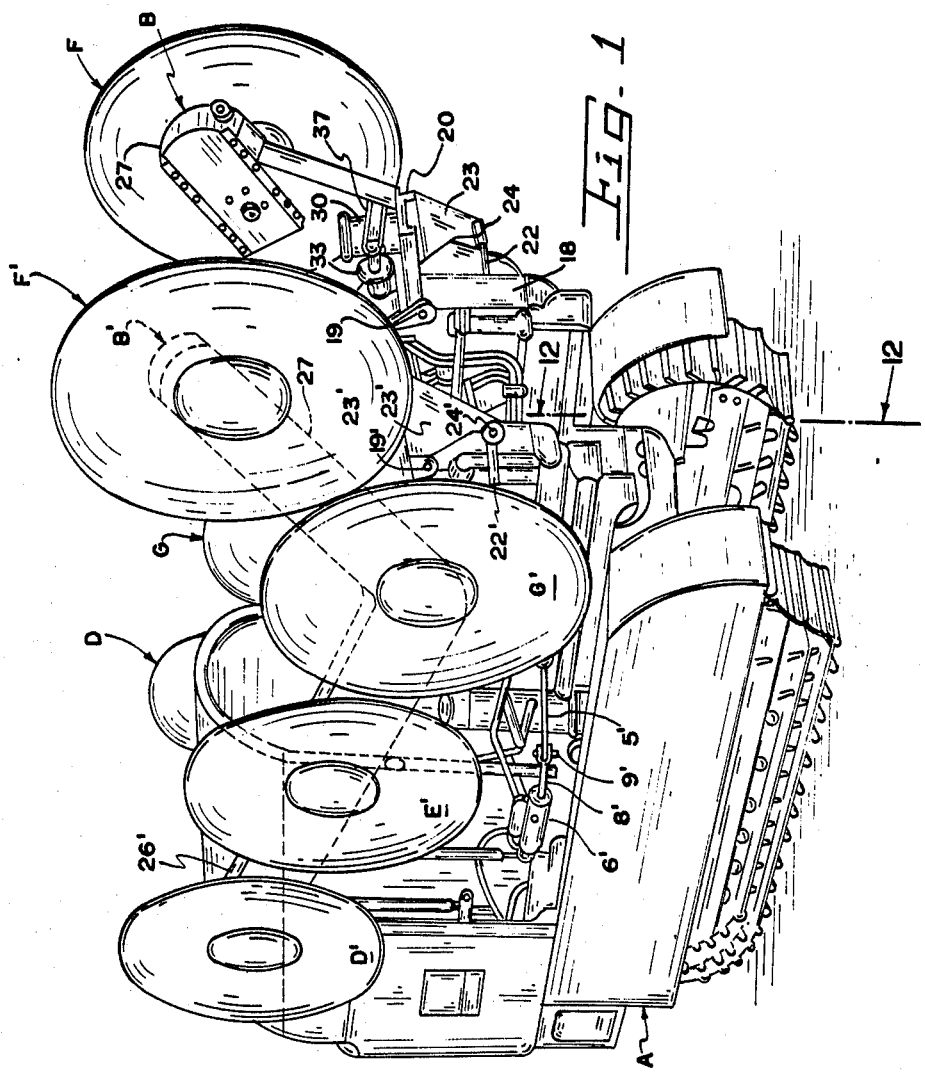
INVENTORS
CLYDE O. LEYDIG
BY MELVIN O. LANGFORD
William R. Piper
ATTORNEY

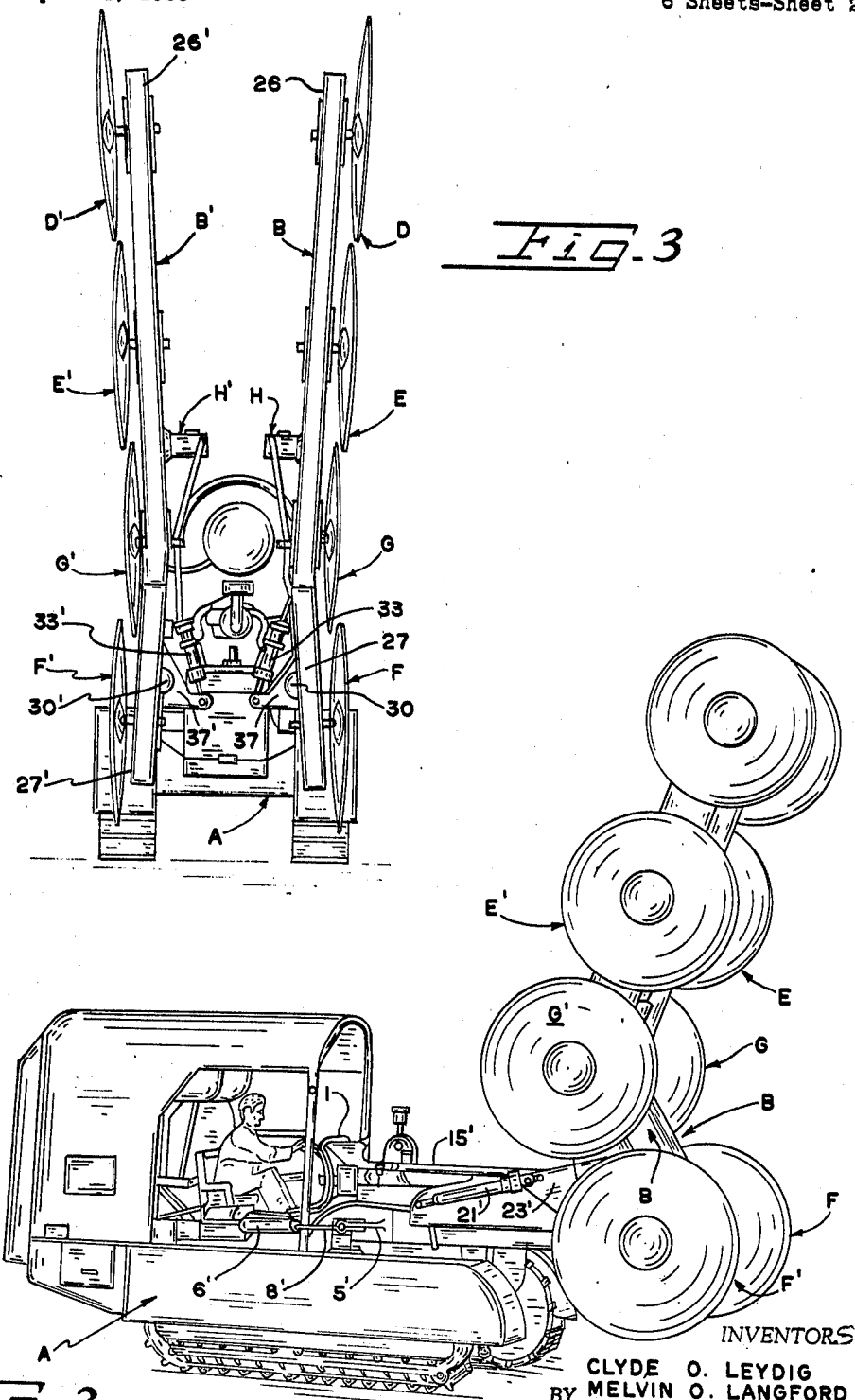

INVENTOR.
CLYDE O. LEYDIG
MELVIN O. LANGFORD
BY
William R. Piper
ATTORNEY

Jan. 6, 1970
C. O. LEYDIG ET AL
3,487,615
DOUBLE-BOOM HEDGER
Filed April 1, 1968
6 Sheets-Sheet 4
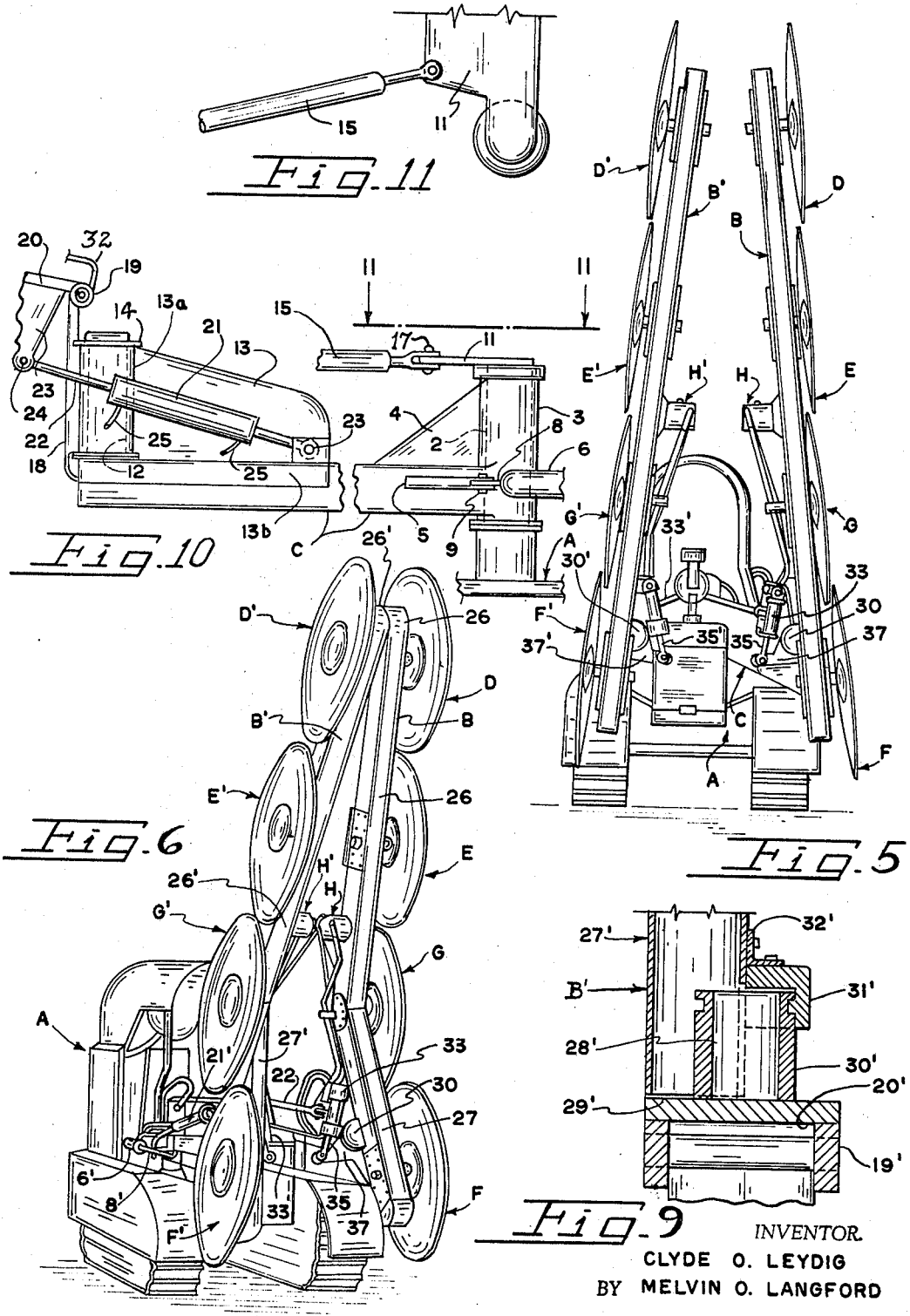
INVENTOR.
CLYDE O. LEYDIG
BY MELVIN O. LANGFORD
William R. Piper
ATTORNEY

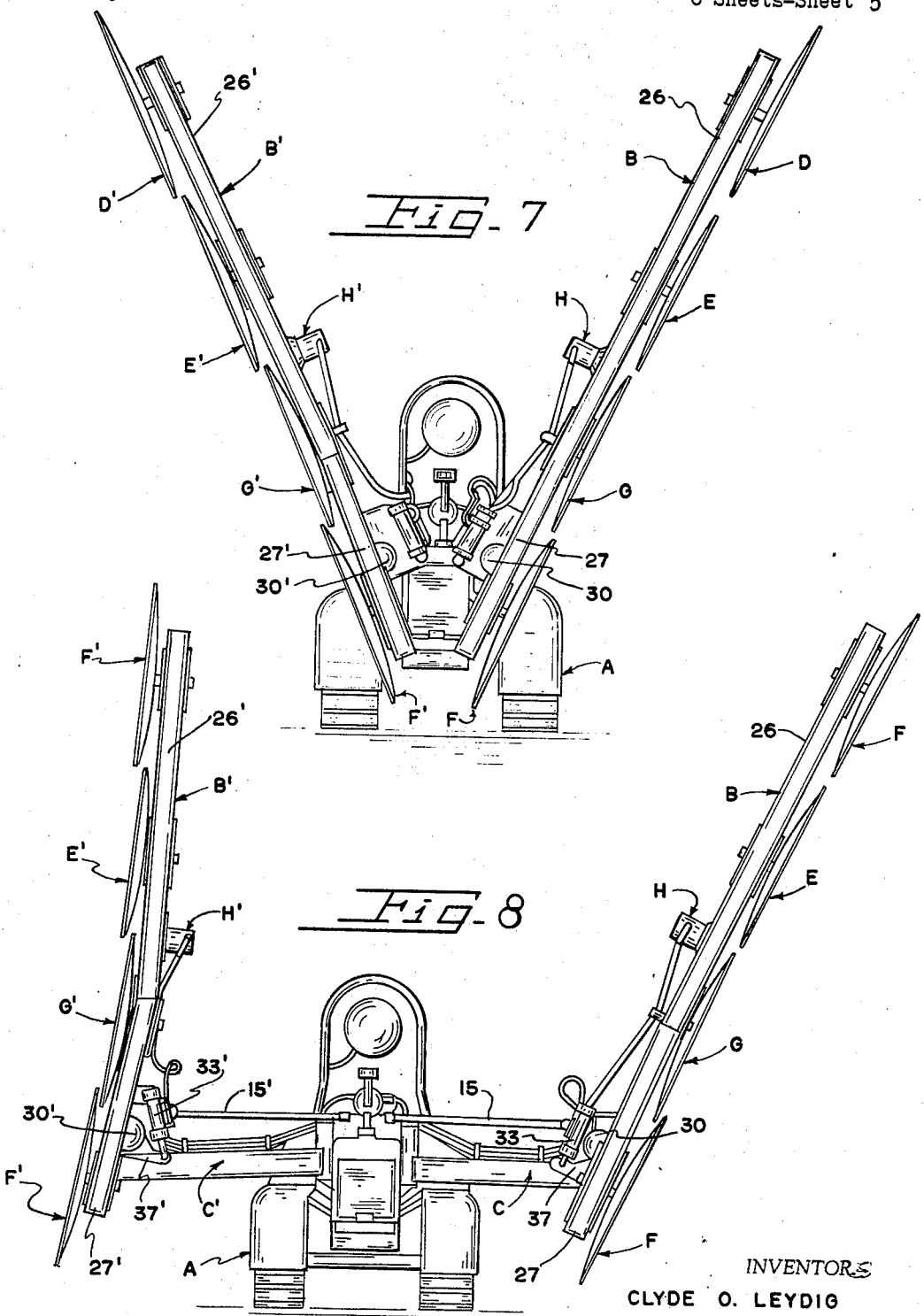

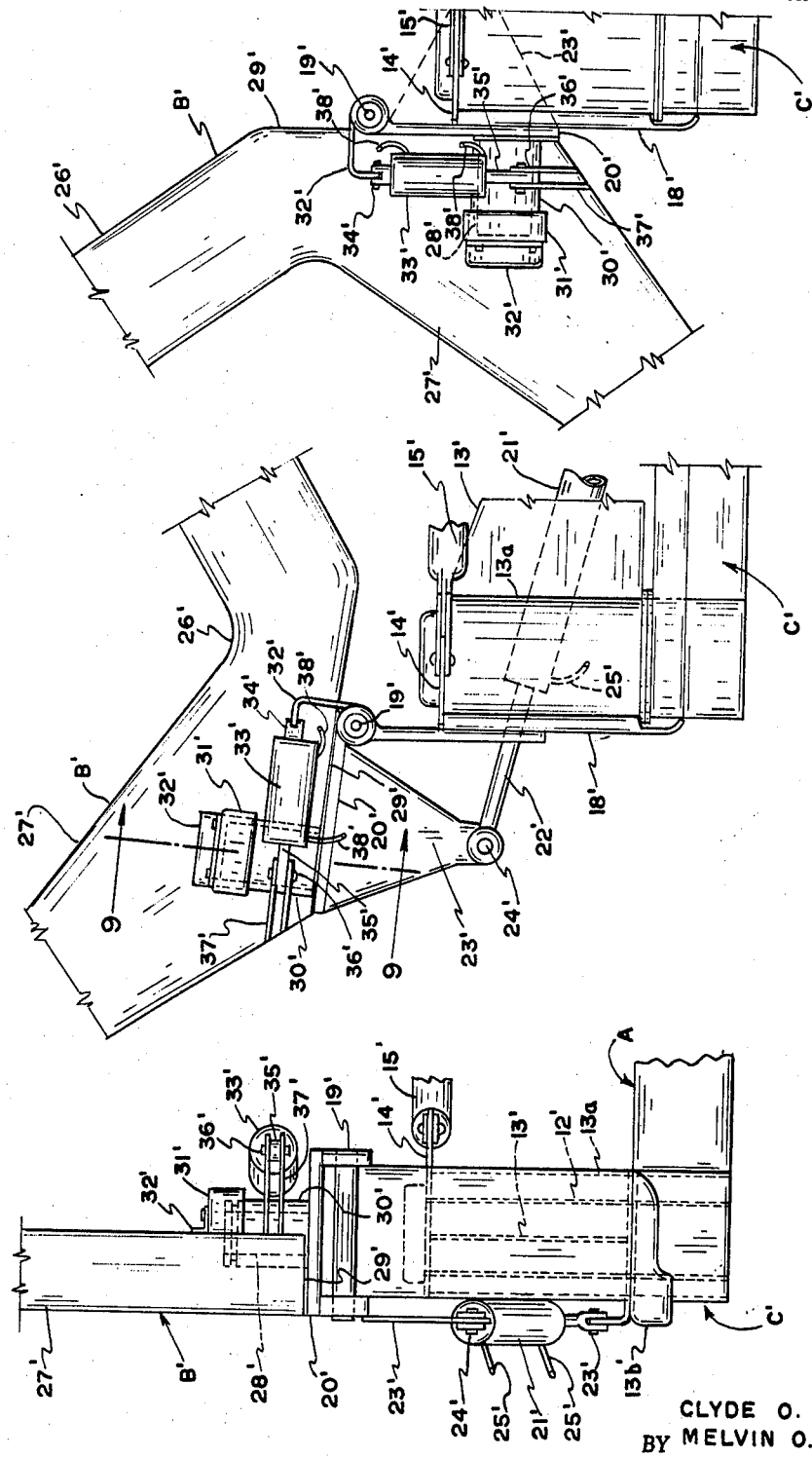

United States Patent Office 3,487,615
Patented Jan. 6, 1970

3,487,615
DOUBLE-BOOM HEDGER
Clyde O. Leydig and Melvin O. Langford, both of Box 276, Exeter, Calif. 93221
Filed Apr. 1, 1968, Ser. No. 717,811
Int. Cl. A01d 55/18
U.S. Cl. 56—235                     6 Claims

ABSTRACT OF THE DISCLOSURE

A double-boom hedger that can move between two rows of trees and has two disc saw carrying booms for trimming branches on each side of the row for widening the row to the desired extent. The two booms can be swung from inoperative to operative position and can also be independently moved laterally with respect to each other to open up the drive row between the two rows of trees to the desired extent. The two booms can be tilted at an angle from a vertical plane.

BACKGROUND OF THE INVENTION

Field of the invention

In the pruning of orchard trees it is necessary to open up rows between parallel rows of trees in order to let light into the soil. This will give more stimulation to lower fruit wood growth and permit better penetration when the trees are sprayed. Also during the picking of the fruit it will give more accessibility for the pickers to reach the fruit and allow the more efficient handling thereof.

Description of the prior art

A patent on a Tree Trimming Machine or the Like, Patent No. 3,192,695, was issued on July 6, 1965. This patent discloses a single boom hedger in which a T-shaped boom carries a plurality of disc saws. The boom is pivotally mounted at the top of an upright which in turn is supported by a tractor. The head of the T-shaped boom extends in a substantially vertical direction and it carries the rotating disc saws. The stem of the T-shaped boom pivots on the upright and power is applied for oscillating the stem for causing the head to reciprocate in substantially a vertical direction and move the rotating disc saws so that they will trim the sides of the row of trees that face the path along which the tractor is travelling. The tractor must make two trips along the same row so that during one trip, the trees on one side of the row are trimmed and during the return trip the trees on the other side of the row are trimmed.

SUMMARY OF THE INVENTION

An object of our invention is to provide a double-boom hedger mounted on a tractor that can move between two rows of trees and simultaneously trim the sides of the trees on both rows that face the path being travelled by the tractor. Each boom rotatably carries a plurality of disc saws whose peripheries are placed close to the peripheries of adjacent saws. The booms can be independently swung from inoperative to operative position and when they are in the latter position, the row of saws on each boom can reach from the lowermost to the top branches of the trees for trimming branches from both rows as the tractor moves between the two rows of trees.

A further object of our invention is to provide novel means for moving the booms laterally while they are in operative position, from points where the two booms are disposed close to one another to points where they are disposed a considerable distance away from each other. In this way the width of the drive row thtat lies between two parallel rows of trees can be determined by the initial spacing of the two booms the desired distance apart from each other. It is also possible to swing the booms independently of each other from a vertical plane to incline them at a desired angle from the vertical, this depending upon the grower's needs.

BRIEF DESCRIPTION OF THE DRAWINGS

FIGURE 1 is a perspective view of the double-boom hedger and shows the two disc saw carrying booms in inoperative position on the tractor.

FIGURE 2 is a perspective view of the machine showing the two booms swung into operative position and their disc saws will present branch cutting means that will extend throughout the heights of the trees.

FIGURE 3 is a front elevation of the machine and also shows the two booms raised into operative position.

FIGURE 5 is a front elevation of the machine and is similar to FIGURE 3 except that the tops of the two booms are inclined toward each other.

FIGURE 6 is a perspective view of the machine and shows the two booms in operative position with the tops of the booms contacting each other.

FIGURE 7 is a front elevation of the machine and shows the two booms in operative position and inclined outwardly at an angle. These are the proper angles for the booms when trimming citrus trees.

FIGURE 8 is another front elevation of the machine but both booms are in operative position and have been moved laterally away from each other. One of the booms is in a reverse tilt and extends inwardly at an angle from a vertical plane while the other is inclined outwardly at an angle with respect to a vertical plane.

FIGURE 9 is a section through a portion of the machine showing how the boom is swingably supported so that it can be swung into a desired inclined position after the boom has been swung into an operative position. The section is taken along the line 9—9 of FIGURE 13.

FIGURE 10 is a side elevation of a part of the machine when looking in the direction of the arrows 10—10 of FIGURE 4.

FIGURE 11 is a top plan view of a portion of FIGURE 10 when looking in the direction of the arrows 11—11 of the figure.

FIGURE 12 is a front elevation of a portion of the left hand boom when looking in the direction of the arrows 12—12 of FIGURE 1.

FIGURE 13 is a side elevation of FIGURE 12 and shows the mechanism for swinging the boom from inoperative to operative position. The boom is in inoperative position.

FIGURE 14 is a view similar to FIGURE 13 and shows the boom in operative position

DESCRIPTION OF THE PREFERRED EMBODIMENT

Figure 4:
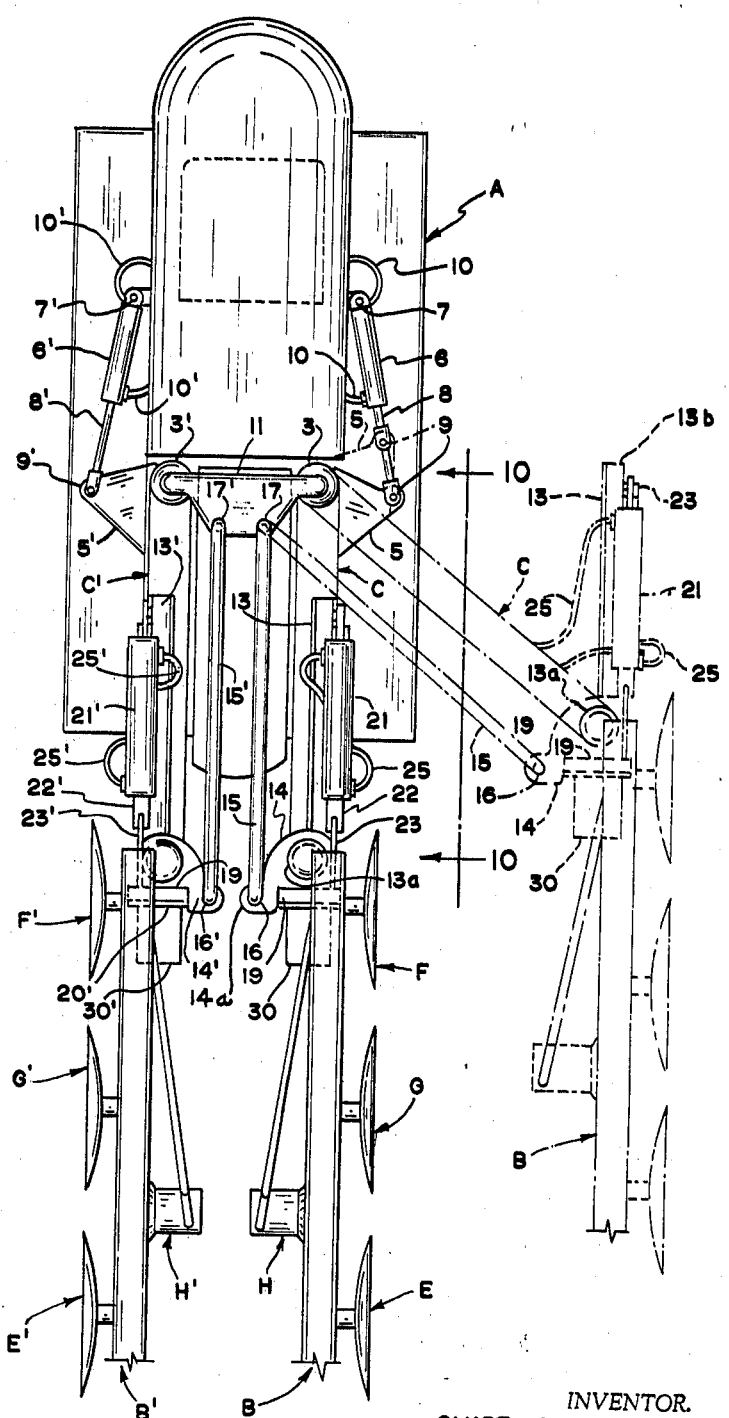
FIGURE 4 is a top plan view of the machine and shows the two booms in operative position. One of the booms is shown moved transversely to the right into a dot-dash line position. Both booms can be moved transversely independently of each other.

In carrying out our invention we show a perspective view of the double-boom hedger in FIGURE 1, and in this view the two saw-carrying booms are in inoperative position. The tractor is indicated generally at A, and the two booms are shown at B and B'. Since both booms are identical to each other except for being for the right side and for the left side, and since they both have the same operative equipment, a detailed description of the boom B will also suffice for the boom B', and all letters and reference numerals applied to the boom B, and its operative parts, will be applied to the boom B', except that they will be primed. Another perspective view of the device is illustrated in FIGURE 2. In this view the operator has swung the booms B, and B' into one of their operative positions. A control board 1 is positioned in front of the operator and a plurality of valve control levers, not shown, are arranged along the control board so that they can be manipulated by the operator for moving the disc saw carrying booms into different desired positions through the action of hydraulic units which will be described. In addition the operator can manipulate the control mechanism, not shown, for driving and steering the tractor A as it moves over the ground.

A top plan view of the tractor A, and booms B, and B', is shown in FIGURE 4. A side elevation of a part of FIGURE 4 is illustrated in FIGURE 10. It will be seen from this latter figure that the tractor A supports a vertically extending cylindrical bearing indicated generally at 2. A horizontal boom-carrying arm C has a sleeve 3 that receives the cylindrical bearing 2 and the arm can be swung into different angular positions in a horizontal plane with the bearing 2 acting as a pivot. A reinforcing gusset plate 4, triangular in shape, is welded to the arm C and to the sleeve 3 for aiding in supporting the arm in a horizontal position.

Again referring to FIGURES 4 and 10, it will be noted that the arm C is rectangular in cross section and that it has a bracket 5 welded to its outer side face, the bracket being disposed near to the bearing sleeve 3. A hydraulic cylinder 6 has one end pivotally secured to the tractor A, at 7. A piston rod 8 extends from the free end of the cylinder and it is pivotally connected to the bracket 5 at 9. Hydraulic lines 10 connect to opposite ends of the cylinder 6 and lead to a control valve and lever, not shown, mounted on the control board 1 and which can be actuated by the operator for swinging the arm C about its bearing support 2. FIGURE 4 shows the arm C swung into a dot-dash line position by the hydraulic cylinder 6.

The tops of the two vertical cylindrical bearings 2 and 2' are interconnected by a bracing plate 11, see FIGURES 4, 10 and 11. This plate will aid in preventing the tops of the two bearings from spreading apart when the boom carrying arms C and C' are swung outwardly for moving the booms B, and B' away from each other for a purpose hereinafter described. We will now describe the means for pivotally supporting the disc saw carrying boom B at the outer end of the arm C. This means will swing the boom about a vertical axis as the boom-carrying arm C is swung outwardly and will always maintain the boom parallel to the longitudinal axis of the tractor. Additional means is provided for swinging the boom about a horizontal axis from an inoperative to an operative position and this means can be operated regardless of the angular position of the boom supporting rm. A third means is provided for swinging the boom into desired inclined positions from a vertical plane after the boom has been swung into operative position. These three operative means for the boom will be described in the order they have just been given.

In FIGURE 10, we show the outer end of the arm C provided with a cylindrical vertical bearing 12. A swingable boom-supporting bracket 13 has a sleeve 13a that is swingably mounted on the vertical bearing 12. The lower edge of the bracket 13 has an angle-shaped portion 13b that will strike the side of the arm C when the plane of the bracket parallels the longitudinal axis of the arm. FIGURE 4 shows the top of the sleeve 13a provided with a flat member 14 that is rigidly secured thereto. A link 15 has one end pivotally secured at 16 to an offset portion 14a of the member 14 and has its other end pivotally secured at 17 to the bracing plate 11. The construction is such that the link 15 will remain parallel to the arm C at all times regardless of the angular position of the arm (note the dot-dash line position of the link and arm in FIGURE 4), and the link will act on the member 14 to maintain the boom B, parallel to the longitudinal axis of the tractor at all times.

A front end view of the boom C' is illustrated in FIGURE 12. In FIGURE 13, the inner side elevation of the boom C' is shown as when looking from the right hand side of FIGURE 12. This side is illustrated in order to show in full lines how the link 15' is connected to the flat member 14', which in turn is rigidly secured to the top of the sleeve 13a'. A flat bumper plate 18, see FIGURE 10, is welded to the vertical sleeve 13a and extends at right angles to the swingable bracket 13 and swings with this bracket. The plate 18 has a horizontally arranged hinge 19 at its top and the axis of the hinge extends at right angles to the plane of the bracket 13. A boom-supporting plate 20 is pivotally connected to the top of the plate 18 by the hinge 19. The arm C' likewise carries the bracket 13', bumper plate 18', hinge 19' and boom-carrying plate 20', see FIGURES 12, 13 and 14. The plates 20 and 20' can be swung from the boom-inoperative position shown in FIGURES 10, 12 and 13, into the boom-operative position where the plate 20', see FIGURE 14, is in contact with the outer face of the bumper plate 18'.

We provide a hydraulic cylinder 21 and a piston rod 22, see FIGURE 10, for swinging the boom-supporting plate 20 about its hinge 19. The cylinder 21 has one end pivotally connected to the swingable bracket 13 at 23. The plate 20 has a lug 23 to which the free end of the piston rod 22 is pivotally connected at 24. FIGURES 9 and 12 to 14 inclusive illustrate the plate 20' for supporting the boom B'. The plate 20' is supporting the boom B' in inoperative position in FIGURES 12 and 13, while in FIGURE 14 the plate has been swung about its hinge 19 into contact with the bumper plate 18' and the boom B' is in one of its operative positions. Hydraulic fluid-conveying conduits 25 communicate with both ends of the cylinder 21, see FIGURE 10, and lead to a source of fluid supply under pressure, not shown, and to a control valve unit, not shown, on the control board 1, shown in FIGURE 2. A separate control valve unit, not shown, is also positioned on the control board 1, and conduit lines 25' lead from the hydraulic cylinder 21', see FIGURES 12 and 13, to this control valve. The operator can manipulate the control levers and swing the boom-carrying plates 20 and 20', independently of each other, to any position desired between the two extreme positions shown for the plate 20' in FIGURES 13 and 14. This will permit the plates 20 and 20' to hold the booms B and B' in the desired angular operative position as will be more fully described hereinafter.

FIGURES 1 and 6 show the two (right and left) disc saw carrying booms B, and B' as being substantially L-shaped with the longer stem 26 of the L making an obtuse angle with the shorter base 27. The longer stem 26 of the L-shaped boom B carries two rotatable disc saws D, and E, while the shorter base 27 carries one rotatable disc saw F. Another disc saw G is placed at the juncture between the stem 26 and the base 27, and this saw will be positioned between the disc saws E and F. We do not wish to be confined to any precise number of disc saws that can be rotatably mounted on the booms B, and B', nor to the number that can be mounted on the stems 26 and 26' and bases 27 and 27'.

We will now describe how the right and left hand booms B and B' are rotatably carried by the boom-supporting plates 20 and 20', respectively. The boom-supporting mechanisms are disposed on the inner sides of the booms and we have illustrated one of these mechanisms for the boom B', in FIGURES 9, 12, 13 and 14. A detailed description of this mechanism will suffice for both. A cylindrical bearing 28' is supported by the plate 20' and has its axis extending perpendicularly to the plate. The boom B' has a flat portion 29' positioned between the longer stem 27' and the shorter base 26' of the boom. This flat portion 29' parallels the outer flat surface of the hinged plate 20'. A bearing sleeve 30' is welded to the hollow boom B' so that substantially one half of the length of the sleeve projects exteriorly of the inner side of the boom, see FIGURES 9 and 12. A half cap 31' fits over the exposed top of the cylindrical bearing 28' and sleeve 30' and it is bolted to a bracket 32' which in turn is bolted to the inner side of the boom B'. The half cap 31' has an arcuate rib that slides in a groove in the sleeve 30'. The construction is such that the boom B' can rotate about the cylindrical bearing 28' into different angular positions as will be presently explained. Also the plate 20' that supports the boom can be swung into different angular positions about the hinge 19', as shown in FIGURES 13 and 14. The mechanism we have just described for the boom B' is duplicated for the boom B.

The means for swinging the right and left hand booms B and B' from inoperative to operative position are controlled by the hydraulic cylinders 20 and 20' and their piston rods 22 and 22', respectively, see FIGURES 12, 13 and 14. The means for moving the booms laterally toward or away from each other are controlled by the hydraulic cylinders 6 and 6' and their piston rods 8 and 8', see FIGURE 4. When the boom-supporting plates 21–21' swing the booms B, and B' into operative position, the booms can also be swung about the cylindrical bearings 28 and 28' so as to be inclined into different angular positions as illustrated in FIGURES 5, 6, 7, 8 and 9.

The boom-supporting plate 20' in FIGURES 13 and 14 carries a bracket 32' that swings with the plate. A hydraulic cylinder 33' has one end pivotally connected at 34' to the bracket 32'. A piston rod 35' extends from the hydraulic cylinder 33' and has its outer end pivotally connected at 36' to a bracket 37' that projects from the inner side of the boom B'. Hydraulic conduits 38' extend from both ends of the cylinder 33' and lead to a control valve, not shown, mounted on the control board 1, where the operator may manipulate the valve for swinging the boom B' about its cylindrical bearing 28' in either one of two directions for a purpose presently to be explained. The boom B is mounted on its boom-supporting plate 20 in identically the same manner as the boom B', and no detailed description of the mounting apparatus for the boom B need be given. The various parts of the apparatus for supporting the boom B that are similar to like parts of the apparatus for the boom B', will be given like reference numerals except that they will not be primed.

The disc saws D, E, F and G and D', E', F' and G' may be rotated by any means desired. FIGURE 1 shows the four disc saws on the boom B' arranged close to each other. The disc saws D', E' and G' are arranged substantially in a straight row and the peripheries of the saws are disposed only a slight distance apart. They provide a combined cutting edge that is practically coextensive with the length of the longer stem 26' of the boom. The base 27' of the boom B' extends at an obtuse angle to the stem 26' and the disc saw F', carried by the base, does not have its axis lying in the same straight line that extends through the axes of the other three saws D', E' and G'.

The reason for this is apparent when the booms B, and B' are swung into operative position, see FIGURE 2, by the hydraulic cylinders 21 and 21' and their piston rods 22 and 22' acting upon the boom-supporting plates 20 and 21' to swing them from the inoperative positions shown in FIGURES 10 and 13, into the operative position shown in FIGURE 14. The operative position of the booms is also shown in FIGURE 2. Note from this figure how the upraised booms B, and B', arrange their saws to form a V-shaped entrance to receive branches of trees that are to be cut as the tractor moves between the two parallel rows of trees. The rotating disc saws will form substantially a continuous branch cutting line that extends throughout the entire lengths of the booms.

FIGURE 3 shows a front elevation of the machine with the booms B, and B' raised into operative position. The booms are hollow and rotatably support the shafts that in turn carry the disc saws. Endless belts and pulleys, not shown, interconnect the shafts and are enclosed in the hollow booms. Hydraulic motors H, and H', see FIGURE 3, are mounted on the booms B, and B' respectively, and are operatively connected to the belts and pulleys that rotate the disc saws. The control valves, not shown, for the hydraulic motors H, and H' are mounted on the control board 1 where the operator may manipulate them.

OPERATION

From the foregoing description of the various parts of the device, the operation thereof will be readily understood. FIGURE 1 shows the tractor A with the right and left hand booms B, and B' in inoperative position which is the position they assume when the tractor is moving from place to place. FIGURE 2 shows the booms swung into operative position while FIGURE 3 shows the raised booms held in spaced apart relation. In FIGURE 6, the operator has actuated the pistons, not shown, in the hydraulic cylinders 33 and 33' for moving the piston rods 35 and 35' and brackets 37 and 37' and causing the booms B, and B' to swing about their cylindrical bearings 28 and 28' so that the outer ends of the stems 26 and 26' of the booms will abut each other.

FIGURE 5 is a front elevation of the machine similar to FIGURE 6, except that the arm C that supports the boom B, has been swung outwardly to a slight extent by the hydraulic cylinder 6 causing the piston rod 8 to swing the bracket 5 that is connected to the arm, see also the plan view of FIGURE 4. The tops of the two booms in FIGURE 5 are still inclined toward each other. In FIGURE 7, the two booms B, and B' have their tops inclined outwardly to incline the booms at an angle for pruning citrus trees. FIGURE 8 shows the boom B still inclined at the same angle as shown in FIGURE 7, but the arm C has also been swung for moving the boom laterally to the right of the tractor A when looking at this figure. The left hand boom B' in FIGURE 8 has been inclined inwardly at an angle from the vertical and the arm C' has swung the boom outwardly to the left from the tractor when looking at this figure. The angle of the boom B' when inclined inwardly to a slight extent is the angle at which it is best to prune deciduous trees.

In FIGURE 8, the boom B', is illustrated as being in a reverse tilt. It is possible to swing the boom B' still further in a clockwise direction about its pivot 30', when looking at FIGURE 8, so as to incline the boom for causing its rotating discs to undercut deciduous trees. The boom-supporting arm C' would be swung outwardly to move the pivotal support 30' for the boom B' farther away from the tractor in order that the boom could be inclined at the desired angle for undercutting the deciduous trees.

One of the novel features of our invention is to support each boom B, and B' on a hinge apparatus that has three separate axes of rotation disposed close together and extending in different directions. The first axis is the vertical cylindrical bearing, one being shown at 12' in FIGURE 12. The bracket 13' swings about this axis to maintain the boom B' parallel to the longitudinal axis of the tractor A regardless of the angular position of the boom-supporting arm C'.

The second axis for each boom B, and B' is that for the hinge 19 or 19'. FIGURES 13 and 14 show the hinge 19', and its axis is horizontal and it extends at right angles to the vertical axis of the cylindrical bearing 12'. The plate 20' swings about the second axis between the two extreme positions shown in these two figures. The third axis extends perpendicular to the boom-supporting plate 20' and it is disposed near to the axis 19. The third axis is for the cylindrical bearing 28', see FIGURE 9, and the sleeve 30' swings about this bearing and is connected to the boom B' for permitting the lateral swinging of the boom.

It will be clear from a reading of the entire description, the booms B, and B' are identical except that they are designed for the right and left hand sides of the machine. The same is true of the boom-supporting arms C, and C', the flat members 14 and 14', the bumper plates 18 and 18', and the bearing sleeves 30 and 30' that support the booms B, and B', respectively.

It will be seen from FIGURE 4 that the axis of the bearing sleeve 30 for the boom B lies in the same vertical plane in which the swingable bracket 13 lies and also the axis of the bearing sleeve 30' for the boom B' lies in the same vertical plane in which the swingable bracket 13' lies. The planes of the swingable brackets 13 and 13' will remain parallel to each other regardless of the angular positions taken by the boom-supporting arms C and C'. The horizontal hinges 19 and 19' will always remain at right angles to the planes of the swingable brackets 13 and 13' and this means that the axis for the bearing sleeve 30 will swing in a plane that is always parallel to the plane in which the axis of the bearing sleeve 30' swings when the booms B, and B' are swung from inoperative to operative positions.

FIGURE 12 shows the axis for the boom-supporting bearing sleeve 30' lying in the same vertical plane in which lies the axis of the vertically extending bearing 12' that supports the swingable bracket 13'. The axis of the bearing sleeve 30' will remain in this same vertical plane during the entire swinging movement of the boom B' from its inoperative position shown in FIGURE 13 into its operative position shown in FIGURE 14. The same is true for the axis for the boom-supporting bearing sleeve 30 which will always lie in the same vertical plane that is occupied by the axis of the vertically extending bearing 12 that supports the swingable bracket 13.

The horizontal axis for the hinge 19', see FIGURE 13, is disposed close to the vertical axis of the bearing sleeve 13a and the axis for the bearing sleeve 30' is disposed close to the axis of the hinge 19'. This structure gives the boom B' almost a universal connection with the outer end of the arm C' and permits the operator to swing the boom into the various positions shown in FIGURES 1, 2, 3, the dot-dash line position shown in FIGURE 4, and the various other positions illustrated in FIGURES 5, 6, 7 and 8. The boom B, can be likewise moved into similar positions as the boom B', and independently thereof.

We claim:
1. A double-boom hedger comprising:
   (a) a vehicle movable over the ground;
   (b) a pair of boom-supporting arms pivotally carried by said vehicle and being swingable in a horizontal plane about vertical spaced apart axes;
   (c) means for swinging said arms independently of each other from positions where said arms parallel each other into positions where the arms extend outwardly at desired angles with respect to the longitudinal axis of said vehicle;
   (d) a tree pruning boom associated with each arm;
   (e) a boom-supporting plate for each boom;
   (f) a pivotal support connecting each boom to its associate boom-supporting plate so that the axis of each pivotal support is perpendicular to the plane of its associate boom-supporting plate;
   (g) a bumper plate hinged to each boom-supporting plate for supporting the latter, the connecting hinge between each bumper plate and its associate boom-supporting plate lying in a horizontal plane and extending at right angles to a vertical plane in which the axis lies for said pivotal connection between the boom and its pivotal connection with its associate boom-supporting plate;
   (h) a bracket for supporting each bumper plate, each bracket having a pivotal connection with its associate arm at the outer end of the arm, the bracket being swingable about a vertical axis that lies in the same vertical plane in which lies the axis for the pivotal connection between the boom and its associate boom-supporting plate;
   (i) independent first means for maintaining the axis of each hinge that connects each bumper plate to its associate boom-supporting plate, at right angles at all times to a median vertical plane that extends throughout the length of said vehicle regardless of the angular position of said boom-supporting arm; whereby the axis that pivotally connects each boom to its associate boom-supporting plate will always be maintained in a parallel relation with said median vertical plane extending throughout the vehicle length;
   (j) independent second means for swinging each boom-supporting plate from a position where the boom is supported in an inoperative position into one where said boom-supporting plate abuts its associate bumper plate for holding the boom in operative position; and
   (k) independent third means for swinging each boom laterally about its associate pivotal support that connects it to its boom-supporting plate for inclining the boom at a desired angle.

2. The combination as set forth in claim 1: and in which
   (a) a plurality of tree-pruning disc saws are rotatably carried by each boom, the disc saws on each boom being arranged so that adjacent saws will have their peripheries spaced only a slight distance apart; and
   (b) means for rotating said disc saws on each boom.

3. The combination as set forth in claim 1: and in which
   (a) each boom is substantially L-shaped with the longer stem of the boom making an obtuse angle with the shorter base;
   (b) a first disc saw rotatably mounted on each boom at the juncture of the stem with its base, the saw being disposed on the outer side of the boom;
   (c) a second disc saw rotatably carried by the base of each boom and having its periphery spaced a slight distance from the periphery of its associate first disc saw, the planes of the two disc saws lying in a common plane;
   (d) a row of disc saws rotatably carried by the stem of each boom and having their peripheries spaced a slight distance apart from each other, each row extending radially from the first disc so that the planes of the disc saws will lie in a common plane; this row of disc saws plus said first disc making an obtuse angle with the shorter row formed by the first and second mentioned disc saws;
   (e) said boom swinging means when positioning said booms in inoperative position causing their stem portions to extend substantially in the direction of the length of said vehicle with the disc saws being arranged on the outer sides of the booms and when positioning said booms in operative position causing the stem portions to extend upwardly and forwardly of said vehicle and the base portions to extend downwardly and forwardly of said vehicle.

4. The combination as set forth in claim 1: and in which
   (a) said independent third means for swinging each boom laterally is adapted to swing each boom clockwise or counterclockwise about its pivotal support from a substantially vertical position into an inclined position after said independent second means has swung each boom into an operative position.

5. In combination:
   (a) a vehicle;
   (b) a boom-supporting arm having one end pivotally connected to said vehicle;
   (c) a first means for swinging said arm in a horizontal plane about its pivot;
   (d) a bracket pivotally supported at the free end of said arm;
   (e) a bumper plate carried by said bracket;
   (f) a boom-supporting plate having a hinged connection with said bumper plate for being supported by the latter;

(g) a second means for maintaining the axis of the hinge connection between said boom-supporting plate and said bumper plate at right angles to a vertical plane that parallels the longitudinal axis of said vehicle;

(h) a saw-carrying boom having a pivotal connection with and being supported by said boom-supporting plate, the axis of the pivotal connection being normal to the plane of said boom-supporting plate and always lying in a plane that parallels the longitudinal axis of said vehicle regardless of the angular position of said boom-supporting arm;

(i) a third means for swinging said boom-supporting plate about its hinged connection with said bumper plate for moving said boom from inoperative to operative position; and (j) a fourth means for swinging said boom about its pivotal connection with its boom-supporting plate for inclining the boom in a desired direction when said boom is in operative position.

6. The combination as set forth in claim 5: and in which (a) the pivotal support between said bracket and the free end of said arm is about a vertical axis;

(b) the hinged connection between said bumper plate and said boom-supporting plate being disposed close to and positioned just above said pivotal support between said bracket and said arm; and (c) said pivotal connection between said saw-carrying boom and said boom-supporting plate being disposed close to the hinged connection between said bumper plate and said boom-supporting plate;

(d) whereby said boom can be laterally moved away from and toward said vehicle by the swinging of said boom-supporting arm acted upon by said first means, said boom can be swung rearwardly and forwardly about the horizontal hinge connecting said boom-supporting plate with said bumper plate by said third means that swings said boom-supporting plate for moving said boom into an upright operative position, and said boom can be swung laterally about its pivotal connection with positions so that the top of said boom can be moved to either side of a vertical position when the boom is in operative position.

References Cited
UNITED STATES PATENTS

| | | | |
|---|---|---|---|
| 1,039,338 | 9/1912 | Wallace | 143—43 |
| 2,815,048 | 12/1957 | Davis | 143—43 XR |
| 3,157,016 | 11/1964 | Leydig et al. | 56—235 |
| 3,200,574 | 8/1965 | Meadowcroft | 56—235 |
| 3,415,046 | 12/1968 | Leydig et al. | 56—235 |

ANTONIO F. GUIDA, Primary Examiner

J. A. OLIFF, Assistant Examiner